United States Patent
Panec

(10) Patent No.: US 10,918,949 B2
(45) Date of Patent: Feb. 16, 2021

(54) SYSTEMS AND METHODS TO PROVIDE A SPORTS-BASED INTERACTIVE EXPERIENCE

(71) Applicant: Disney Enterprises, Inc., Burbank, CA (US)

(72) Inventor: Timothy M. Panec, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 24 days.

(21) Appl. No.: 16/459,234

(22) Filed: Jul. 1, 2019

(65) Prior Publication Data

US 2021/0001225 A1    Jan. 7, 2021

(51) Int. Cl.
*A63F 13/573* (2014.01)
*G06T 11/00* (2006.01)
*A63F 13/53* (2014.01)
*A63F 13/65* (2014.01)

(52) U.S. Cl.
CPC ............ *A63F 13/573* (2014.09); *A63F 13/53* (2014.09); *A63F 13/65* (2014.09); *G06T 11/00* (2013.01); *A63F 2300/8011* (2013.01); *A63F 2300/8082* (2013.01)

(58) Field of Classification Search
CPC ........ A63F 13/573; A63F 13/53; A63F 13/65; A63F 2300/8011; A63F 2300/8082; G06T 11/00
See application file for complete search history.

(56) References Cited

U.S. PATENT DOCUMENTS

| | | | |
|---|---|---|---|
| 6,162,123 A | 12/2000 | Woolston | |
| 7,331,856 B1 | 2/2008 | Nakamura | |
| 7,839,382 B2 | 11/2010 | Ueshima | |
| 7,874,918 B2 | 1/2011 | Osnato | |
| 8,368,721 B2* | 2/2013 | McCoy | A63F 13/213 345/633 |
| 2005/0014542 A1 | 1/2005 | Ueshima | |
| 2006/0116185 A1* | 6/2006 | Krull | A63F 13/213 463/4 |
| 2007/0021199 A1* | 1/2007 | Ahdoot | A63F 13/577 463/30 |
| 2007/0126700 A1 | 6/2007 | Wright | |
| 2007/0252815 A1 | 11/2007 | Kuo | |

(Continued)

OTHER PUBLICATIONS

FIFA 2015, https://www.youtube.com/watch?v=H5zQec03s_g, Published on Sep. 10, 2014.

(Continued)

*Primary Examiner* — Corbett B Coburn
(74) *Attorney, Agent, or Firm* — Esplin & Associates, PC

(57) ABSTRACT

This disclosure presents systems and methods to provide sports-based interactive experiences. The interactive experiences may be facilitated by providing users' views of virtual content related to a particular sport. The systems and methods may utilize action sequence information and/or other information. The action sequence information may specify anticipated sequences of output signals generated by sensors coupled to real-world items of playing equipment. The output signals in the anticipated sequences of output signals may be associated with anticipated control signals for controlling the virtual content.

20 Claims, 6 Drawing Sheets

(56) References Cited

U.S. PATENT DOCUMENTS

| | | |
|---|---|---|
| 2007/0270222 A1 | 11/2007 | Yamanaka |
| 2008/0280660 A1 | 11/2008 | Ueshima |
| 2008/0312010 A1* | 12/2008 | Marty ............... A63B 69/00 |
| | | 473/447 |
| 2009/0048021 A1 | 2/2009 | Lian |
| 2009/0091583 A1* | 4/2009 | McCoy ............... A63F 13/02 |
| | | 345/633 |
| 2009/0298590 A1 | 12/2009 | Marks |
| 2010/0261526 A1 | 10/2010 | Anderson |
| 2011/0034248 A1 | 2/2011 | Grever |
| 2011/0304646 A1 | 12/2011 | Kato |
| 2012/0075285 A1 | 3/2012 | Oyagi |
| 2012/0113228 A1 | 5/2012 | Konno |
| 2012/0172127 A1 | 7/2012 | Kitahara |
| 2012/0256961 A1 | 10/2012 | Ogasawara |
| 2012/0262365 A1 | 10/2012 | Mallinson |
| 2013/0042296 A1 | 2/2013 | Hastings |
| 2013/0229396 A1 | 9/2013 | Huebner |
| 2013/0235078 A1 | 9/2013 | Takahashi |
| 2013/0257907 A1 | 10/2013 | Matsui |
| 2014/0002329 A1 | 1/2014 | Nishimaki |
| 2014/0003651 A1 | 1/2014 | Smoot |
| 2014/0078517 A1 | 3/2014 | Ben-Yishai |
| 2014/0080109 A1 | 3/2014 | Haseltine |
| 2014/0104169 A1 | 4/2014 | Masselli |
| 2015/0062162 A1 | 3/2015 | Kim |
| 2015/0123966 A1 | 5/2015 | Newman |
| 2015/0201188 A1 | 7/2015 | Pritch |
| 2015/0243286 A1 | 8/2015 | Goslin |
| 2016/0189411 A1 | 6/2016 | Matsunaga |
| 2016/0189428 A1 | 6/2016 | Matsubayashi |
| 2016/0206957 A1 | 7/2016 | Goslin |
| 2016/0253842 A1 | 9/2016 | Shapira |
| 2016/0274662 A1 | 9/2016 | Rimon |
| 2016/0307374 A1 | 10/2016 | Kurz |
| 2017/0203225 A1 | 7/2017 | Goslin |
| 2017/0287218 A1 | 10/2017 | Nuernberger |
| 2018/0082430 A1 | 3/2018 | Sharma |
| 2018/0101985 A1* | 4/2018 | Jones-McFadden ............ |
| | | G06K 9/00671 |
| 2018/0293736 A1* | 10/2018 | Rahimi ............... G06K 9/4628 |
| 2018/0373323 A1* | 12/2018 | Ghanchi ............ A63F 13/285 |
| 2019/0102939 A1* | 4/2019 | He ..................... A63F 13/355 |
| 2020/0098179 A1 | 3/2020 | Gough |
| 2020/0289922 A1* | 9/2020 | McCoy ............... A63F 13/213 |

OTHER PUBLICATIONS

Dictionary.com, Defintion of lightsaber, 2019, Dictionary.com, pp. 1-2 (Year: 2019).

Matt Casamassina, "Wii Sports Review" https://www.ign.com/articles/2006/11/14/wii-sports-review. Created Nov. 13, 2006. (12 pages).

* cited by examiner

SYSTEMS AND METHODS TO PROVIDE A SPORTS-BASED INTERACTIVE EXPERIENCE

FIELD

This disclosure relates to systems and methods to provide a sport-based interactive experience.

BACKGROUND

Devices and systems are available to provide virtual reality (VR) and/or augmented reality (AR) experiences. In particular, handheld and/or wearable technology may be used. Wearable technology may include head-mounted displays (HMD). Handheld technology may include mobile computing platforms, such as smart phones and/or tablets.

SUMMARY

One aspect of the disclosure relates to a system configured to provide a sport-based interactive experience. An interactive experience may take place in an interactive environment. An interactive environment may include one or more of a virtual reality environment, an augmented reality environment, and/or other interactive environment. An augmented reality environment may include views of images of virtual content within a virtual environment superimposed over views of a real-world environment. In some implementations, a user may actively view the real-world environment, for example, through a visor. In some implementations, a user may passively view the real-world environment, for example, through a display that presents images of the real-world environment. A virtual reality environment may include views of images of virtual content within a virtual environment. Virtual content may include one or more virtual objects and/or other virtual content. The terms "space" and "environment" in the context of virtual reality and/or augmented reality may be used interchangeably herein.

In SLAM (Simultaneous Localization and Mapping) applications utilized in AR and/or VR systems, an interpretation of a composition of a physical environment (e.g., a geometry, a layout, and/or other information) may be determined. The interpretation of the composition of the physical environment may be referred to as an "environment record." SLAM and/or other techniques utilized in these systems may allow the presentation devices to commonly share the same or similar environment record when in the same or similar real-world environment. This commonality of the environment record may allow the different presentation devices to experience a shared interactive experience. A shared interactive experience may mean that virtual content may appear in the same relative locations in the real world.

The system configured to provide a provide a sport-based interactive experience may include one or more presentation devices, one or more servers, one or more real-world items of playing equipment, and/or other components.

The one or more real-world items of playing equipment may include physical objects utilized by users to play one or more games in a sports playing area. A real-world item of playing equipment may include one or more sensors, one or more feedback devices, and/or other devices. Individual sensors of a real-world item of playing equipment may be configured to generate output signals conveying information about movement and/or use of the real-world item of playing equipment in a game. Movement may be specified with respect to orientation and/or change in orientation, location and/or change in orientation, and/or other information. Other uses may include instances of contact with the real-world item of playing equipment by an object and/or user. The instances of contact may be specified with respect to the occurrence (e.g., that a contact occurred) and/or an amount of force (or pressure) imparted during a contact.

The server(s) may include and/or may be coupled to one or more of one or more physical processors, non-transitory electronic storage medium, and/or other components. The non-transitory electronic storage medium may be configured to store one or more of virtual content information, environment record information, action sequence information, and/or other information.

The environment record information may define one or more environment records. An environment record may include a composition of a real-world environment. The real-world environment may comprise a sports playing area. The sports playing area may include one or more of a field, a tabletop surface, a court, a pitch, a course, and/or area commonly designated for the play of a game. The composition of the real-world environment may include one or more reference points in the sports playing area. The individual reference points may correspond to items of play equipment and/or locations specific to the sports playing area. By way of non-limiting illustration, reference points in a baseball field may include the bases. By way of non-limiting illustration, reference points in a basketball court may include the baskets.

The virtual content information may define a virtual environment including virtual content. The virtual environment may be specified with respect to one or more reference points within the real-world environment and/or other points of reference. The virtual content may include one or more virtual objects. Individual virtual objects may be configured to experience locomotion within the virtual environment. The one or more virtual objects may include a first virtual object depicting an item of playing equipment specific to the sports playing area. By way of non-limiting illustration, for a baseball field, the first virtual object may include a baseball.

The action sequence information may specify one or more anticipated sequences of output signals generated by sensors coupled to real-world items of playing equipment. An anticipated sequence of output signals information may be based on known, conventional, and/or otherwise anticipated movement and/or use of the real-world items of playing equipment in accordance with one or more games to be played in the sports playing area. By way of non-limiting illustration, for baseball, it may be anticipated that a bat will be swung (e.g., hitting a pitch), followed by a contact with first base by the user who swung the bat.

In some implementations, the action sequence information may specify associations between individual output signals in the anticipated sequences of output signals with anticipated control signals for controlling the virtual content. The anticipated control signals may be associated with control of virtual content such that the virtual content reacts in known, conventional, and/or otherwise anticipated ways in response to the known, conventional, and/or otherwise anticipated movement and/or use of the real-world items of playing equipment.

By associating the anticipated output signals with anticipated control signals, the anticipated control signals may be queued into the system for immediate and/or near-immediate implementation to control the virtual content as close to real-world timing as possible. In particular, the queuing of the control signals and subsequent implementation to control the virtual content may cause the user(s) to perceive the control of the virtual content as if locomotion of the virtual content is responsive to their real-world actions with minimal perceived delay or lag.

By way of non-limiting illustration, action sequence information may specify a first anticipated sequence of output signals including a first output signal generated by a first sensor coupled to a first real-world item of playing equipment, a second output signal generated by a second sensor coupled to a second real-world item of playing equipment, and/or other output signals generated by other sensors. The first output signal may be associated with a first control signal for controlling the first virtual object. By way of non-limiting illustration, for baseball, output signals conveying swinging of a bat may be associated with control signals for controlling locomotion of a virtual baseball along a trajectory calculated based on the speed of the swing and/or other information. Further, an anticipated sequence of output signals may include output signals conveying contact with first base following the output signals conveying swinging of a bat. The output signals conveying contact with first base may be associated with control signals for controlling locomotion of a virtual opponent to throw the virtual baseball to the second base. This sequence of output signals (e.g., bat swing followed by first base being contacted) is just one example of an anticipated sequence of output signals given the particular game of baseball being played.

The one or more physical processors may be configured by machine-readable instructions. Executing the machine-readable instructions may cause the one or more physical processors to facilitate providing a sport-based interactive experience. The machine-readable instructions may include one or more computer program components. The one or more computer program components may include one or more of an input component, a control component, and/or other components.

The control component may be configured to effectuate presentation of images depicting one or more instances of virtual content on individual presentation devices associated with individual users. The images may be presented such that the one or more instances of the virtual content may be perceived as being physically present in the real-world environment. Such presentation may form an augmented reality experience. By way of non-limiting illustration, presentation may be effectuated of a first image depicting a first instance of the first virtual object on a first presentation device associated with a first user.

The input component may be configured to obtain current output signals generated by sensor(s) coupled to the real-world item(s) of playing equipment. The input component may be configured to determine whether the current output signals match output signals included in the anticipated sequences of output signals.

In response to determining (e.g., by input component) the current output signals match output signals included in the anticipated sequences of output signals, the control component may be configured to control the presentation of the images in accordance with the anticipated control signals. By way of non-limiting illustration, in response to obtaining a first current output signal generated by the first sensor and determining the first current output signal matches the first output signal included in the first anticipated sequence of output signals, control component may control the presentation of the first image of the first instance of the first virtual object based on the first control signal.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
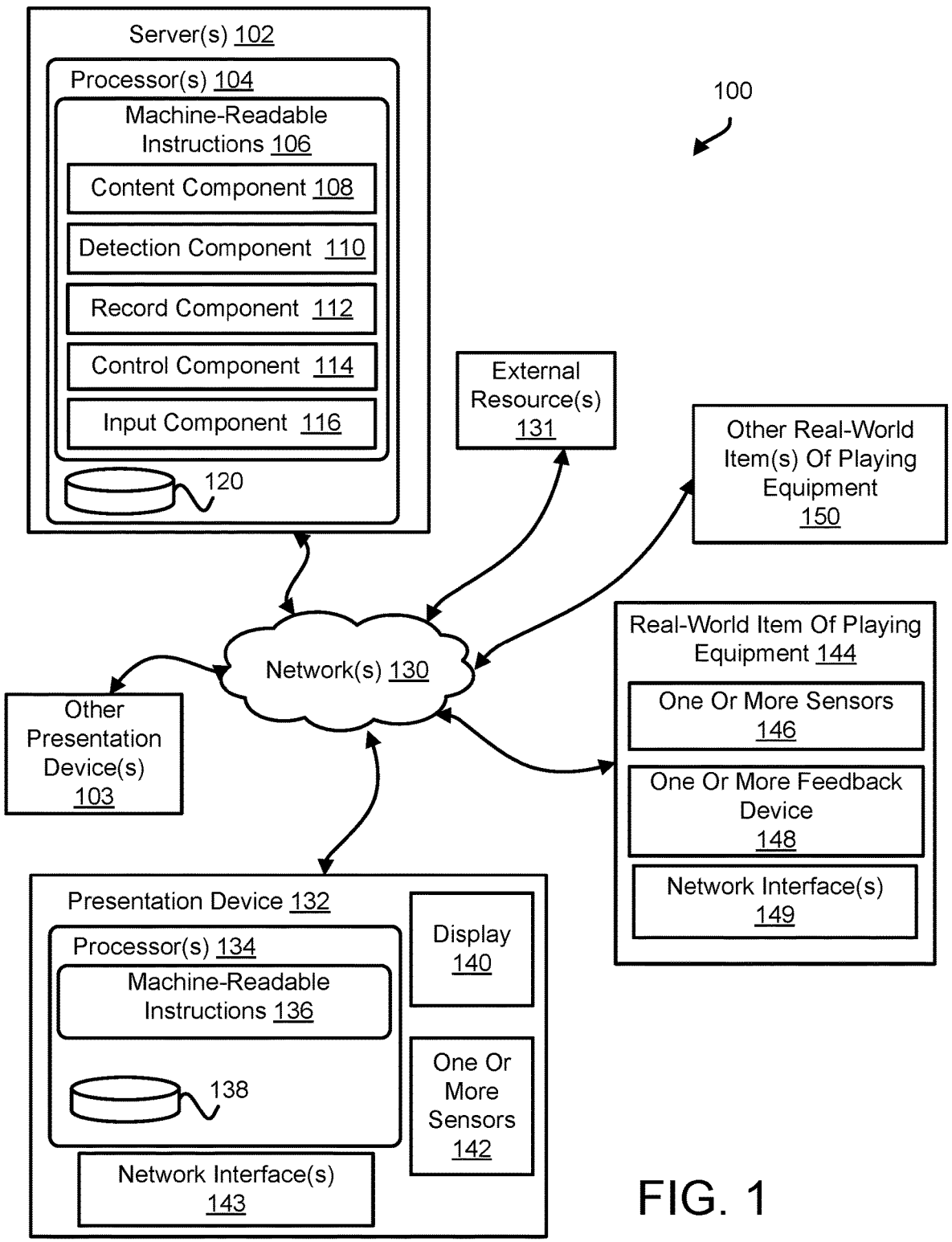
FIG. 1 illustrates a system configured to provide a sport-based interactive experience, in accordance with one or more implementations.

FIG. 1 illustrates a system 100 configured to provide a sport-based interactive experience, in accordance with one or more implementations. The system 100 may facilitate gameplay in a sports playing area. A sports playing area may include one or more of a field, a tabletop surface, a court, a pitch, a course, and/or other areas. The system 100 may facilitate gameplay related to one or more of baseball, basketball, soccer, football, lacrosse, tennis, golf, table tennis, foosball, and/or other games. Accordingly, although one or more descriptions of the systems and methods presented herein may be directed to one particular game, this is for illustrative purposes only and not to be considered limiting. Instead, those skilled in the art may readily recognize that the various features and/or functions presented herein may be implemented, mutatis mutandis, for other games. Further, although one or more descriptions of the systems and methods presented herein may be directed to a single player playing a game, this is for illustrative purposes only and not to be considered limiting. Instead, those skilled in the art may readily recognize that the various features and/or functions presented herein may be implemented to facilitate multiplayer gaming. The multiplayer gaming may be carried out with multiple users playing on a same team and/or opposing teams. Further, it is noted that features and/or functions of the system 100 may be carried out where real-world users play along side virtual teammates.

An interactive experience may include one or more of playing a game, interacting with virtual content, interacting with real-world objects, interacting with other users, and/or other experiences. An interactive experience may take place in an interactive space. An interactive space may include one or more of an augmented reality (AR) environment, a virtual reality (VR) environment, and/or other interactive spaces. An augmented reality environment may include views of images of virtual content within a virtual environment superimposed over views of a real-world environment. In some implementations, a user may actively view the real-world environment, for example, through a visor. In some implementations, a user may passively view the real-world environment, for example, through a display that presents images of the real-world environment. A virtual reality environment may include views of images of virtual content within a virtual environment. Virtual content may include one or more virtual objects and/or other virtual content. The terms "space" and "environment" in the context of virtual reality and/or augmented reality may be used interchangeably herein.

The system 100 may include one or more of server(s) 102, a presentation device 132, one or more other presentation devices 103, a real-world item of playing equipment 144, one or more other real-world items of playing equipment 150, one or more external resources 131, and/or other components. It is noted that the features and/or functions of server(s) 102 may be attributed to presentation device 132, and vis versa. Further, while some descriptions herein may be directed to presentation device 132, it is to be noted that other ones of one or more other presentation devices 103 may be configured similarly as presentation device 132. Still further, while some descriptions herein may be directed to real-world item of playing equipment 144, it is to be noted that other ones of one or more other real-world items of playing equipment 150 may be configured similarly as real-world item of playing equipment 144.

The real-world item of playing equipment 144 may include a physical object utilized by users to play one or more games in a sports playing area. The real-world item of playing equipment 144 may include one or more sensors 146, one or more feedback devices 148, one or more network interfaces 149, and/or other devices. In some implementations, the real-world item of playing equipment 144 may include a marker, such as an augmented reality marker, disposed thereon. The marker may facilitate detection and/or localization of the real-world item of playing equipment 144 in a real-world environment (see, e.g., detection component 110).

The one or more network interfaces 149 may include one or more devices and/or software components configured to enable the exchange of information with one or more networks 130. By way of non-limiting illustration, the one or more network interfaces 149 may include a software and/or hardware interface. The one or more network interfaces 149 may include communication lines and/or ports configured to enable the exchange of information with one or more networks 130. The one or more network interfaces 149 may include transceivers and/or other components configured to facilitate communication with one or more of wireless Bluetooth Low Energy (BLE), wired Universal Serial Bus (USB) connection, Wi-Fi, 5G network, and/or other connections.

Individual sensors may be configured to generate output signals conveying information about movement and/or use of real-world item of playing equipment 144 in a game. Movement may be specified with respect to orientation and/or change in orientation, location and/or change in location, and/or other information. Other use may include instances of contact with real-world item of playing equipment 144 by another object and/or user. The instances of contact may be specified with respect to the occurrence (e.g., that a contact occurred) and/or an amount of force (or pressure) imparted during a contact.

Individual sensors of one or more sensors 146 may be configured to generate output signals. In some implementations, an individual sensor may include one or more of an orientation sensor, a depth sensor, a location, a pressure sensor, and/or other sensors.

An orientation sensor may be configured to generate output signals conveying orientation information and/or other information. Orientation information derived from output signals of an orientation sensor may define an orientation of real-world item of playing equipment 144. In some implementations, orientation of real-world item of playing equipment 144 may refer to one or more of a pitch angle, a roll angle, a yaw angle, a heading, a pointing direction, a bearing, and/or other measurements. An orientation sensor may include an inertial measurement unit (IMU) such as one or more of an accelerometer, a gyroscope, a magnetometer, inclinometers, and/or other devices.

In some implementations, a depth sensor may be configured to generate output signals conveying depth information and/or other information. Depth information may include distance and/or range of real-world surfaces and/or objects from the depth sensor, and/or other information. In some implementations, depth information may be provided in the form of a point cloud. A point cloud may include a set of points. Individual points may represent individual surfaces within the real world. The depth information may specify, for individual points, one or more of an individual distance of the point from the depth sensor, an individual position and/or direction of the point with respect to the depth sensor, and/or other information. In some implementations, a depth sensor may comprise one or more of a time-of-flight sensor, a structured light sensor, an unstructured light sensor, an active stereo pair, a passive stereo pair, and/or other depth sensing devices.

In some implementations, a location sensor may be configured to generate output signals conveying location information and/or other information. Location information may include location of the location sensor within the real-world environment. The location may be specified with respect to a composition of a real-world environment as specified by an environment record. A change in location over unit time may convey a speed. In some implementations, a location sensor may comprise a global position system (GPS), and/or other location sensing devices.

A pressure sensor may be configured to generate output signals conveying pressure information, contact information, and/or other information. Pressure information derived from output signals of a pressure sensor may define a force per unit area imparted to the pressure sensor. Contact information derived from output signals of a pressure sensor may specify instances of contact. A pressure sensor may include one or more of a piezoresistive strain gauge, a capacitive pressure sensor, an electromagnetic pressure sensor, a piezoelectric sensor, a strain-gauge, and/or other pressure sensors.

Individual feedback devices of one or more feedback devices 148 may be configured to provide haptic feedback. The haptic feedback may be provided in sync with presentation of virtual content. The haptic feedback may be provided in response to simulated contact of a real-world item of playing equipment and virtual content (e.g., a virtual object), and/or in other instances. In some implementations, haptic feedback may include one or more of vibration, resistance, heat, cooling, and/or other feedback. An individual feedback device may comprise one or more of a vibration motor, a heating element, a fan or blower, a gyroscope, and/or other device configured to provide haptic feedback. A gyroscope may be controlled to change the resistance of moving an item of real-world item of playing equipment to simulate a feel of the real-world item of playing equipment being weighted and/or receiving an impact. For example, relatively low speed(s) of rotation by a gyroscope may provide relatively low resistance while relative high speed(s) of rotation by the gyroscope may provide relatively high resistance. By way of non-limiting illustration, if the real-world item of playing equipment comprises a baseball glove, a gyroscope in the glove may be controlled to change the resistance of moving the glove to simulate a feel of the glove being weighted by a virtual baseball. By way of non-limiting illustration, if the real-world item of playing equipment comprises a baseball bat, a gyroscope in the glove may be controlled to change the resistance of moving the glove to simulate a feel of a virtual ball contacting the bat during a swing.

The server(s) 102 may include one or more of one or more physical processors 104, non-transitory electronic storage 120, and/or other components. One or more physical processors 104 may be configured to provide information-processing capabilities in server(s) 102. As such, in some implementations, processor(s) 104 may include one or more of a digital processor, an analog processor, a digital circuit designed to process information, an analog circuit designed to process information, a state machine, and/or other mechanisms for electronically processing information.

In some implementations, one or more physical processors 104 may be configured to provide remote hosting of features and/or functions of machine-readable instructions 106 to presentation device 132. In some implementations, one or more physical processors 104 may be remotely located from presentation device 132. The one or more physical processors 104 may communicate with presentation device 132, via client/server architecture, and/or other communication schemes.

The non-transitory electronic storage 120 may be configured to store one or more of virtual content information, environment record information, action sequence information, user information, and/or other information.

The environment record information may define one or more environment records. An environment record may include a composition of a real-world environment. A composition may include one or more of a geometry, a layout, location of one or more reference points, and/or other information about a physical space in the real world. The real-world environment may comprise a sports playing area. The sports playing area may include one or more of a field, a tabletop surface, a court, a pitch, a course, and/or other area. The individual reference points may correspond to items and/or locations specific to the sports playing area. By way of non-limiting illustration, reference points in a baseball field may include the bases. By way of non-limiting illustration, reference points in a basketball court may include one or more of the baskets, center court, 3-point line, free throw line, and/or other reference points.

The virtual content information may define a virtual environment including virtual content. The virtual environment may be specified with respect to one or more reference points within the real-world environment and/or other points of reference. The virtual content may include one or more virtual objects. The one or more reference points may provide points of reference for specifying portions of the virtual environment and/or specifying where virtual objects may be placed. In some implementations, a reference point may act as a point of origin for a coordinate system of the virtual environment.

Individual virtual objects may be configured to experience locomotion within the virtual environment. The one or more virtual objects may include a first virtual object depicting an item of playing equipment specific to the sports playing area. By way of non-limiting illustration, for a baseball field, the first virtual object may include a baseball. Locomotion may include one or more of spin, movement along a trajectory, vibration, and/or other consideration of locomotion. In some implementations, locomotion may follow conventional considerations of the laws of physics.

The action sequence information may specify one or more anticipated sequences of output signals generated by sensors coupled to real-world items of playing equipment. In some implementations, a set of one or more anticipated sequences of output signals may be associated with, and/or specific to, a particular game.

An anticipated sequence of output signals may be based on known, conventional, and/or otherwise anticipated movement and/or use of the real-world items of playing equipment in accordance with one or more games to be played in the sports playing area. In some implementations, the known, conventional, and/or otherwise anticipated movement and/or use of the real-world items of playing equipment may include movement and/or use of items that may generally be associated with positive progress of gameplay. Positive progress of gameplay may include movement and/or use of the real-world items of playing equipment that may generally improve a player's (or team's) standing in a game. By way of non-limiting illustration, for baseball, it may be positively anticipated that a bat will be swung (e.g., hitting a pitched ball), followed by a contact with first base by the user who swung the bat as subsequently ran to first base, and/or followed by other anticipated movement. Alternatively, movement and/or use of the real-world items of playing equipment may include movement and/or use of items that may generally be associated with negative progress of gameplay. The negative progress may include movement and/or use of the real-world items of playing equipment that may generally impede a player's (or team's) standing in a game. By way of non-limiting illustration, for baseball, it may be negatively anticipated that a bat may be swung in a manner that does not strike a pitched ball (resulting in a strike, and either another pitch being thrown, or an inning being ended), a runner will contact a base after a baseman has already caught a ball (conveying the runner is called "out"), and/or other movement.

In some implementations, action sequence information may specify associations between individual output signals in the anticipated sequences of output signals with anticipated control signals for controlling the virtual content. The anticipated control signals may be related to the control of the locomotion of the individual virtual objects. The anticipated control signals may be associated with control of virtual content such that the virtual content is perceived to react in known, expected, conventional, and/or otherwise anticipated ways in response to the known, conventional, and/or otherwise anticipated movement and/or use of the real-world items of playing equipment. In some implementations, the control of the locomotion of the virtual content based on control signals may including control of one or more of a speed, spin, trajectory, drag, and/or other control. In some implementations, the anticipated control signals may include incomplete control signals. For example, an anticipated control signal may correspond to a particular anticipated control of a virtual object, but some parts of the anticipated control signal may be needed to be determined in order to implement the control signal. For example, it may be anticipated that a control signal may control a virtual object to move along a trajectory, but the speed of movement and/or other locomotion may not be known until current output signals from a real-world item of playing equipment are obtained to determine the speed or other aspects of the locomotion.

By associating the anticipated output signals with anticipated control signals, the control signals may be queued into the system for immediate and/or near-immediate implementation to control the virtual content as close to real-world timing as possible. In particular, the queuing of the control signals and subsequent implementation to control the virtual content may cause the user(s) to perceive the control of the virtual content as if locomotion of the virtual content is responsive to their real-world actions while utilizing real-world items of playing equipment with minimal perceived delay or lag.

By way of non-limiting illustration, action sequence information may specify a first anticipated sequence of output signals including a first output signal generated by a first sensor coupled to a first real-world item of playing equipment, a second output signal generated by a second sensor coupled to a second real-world item of playing equipment and/or other output signals generated by other sensors. The first output signal may be associated with a first control signal for controlling the first virtual object. By way of non-limiting illustration, for baseball, output signals conveying swinging of a bat may be associated with control signals for controlling locomotion of a virtual baseball along a trajectory calculated based on the speed of the swing and/or other information (see, e.g., control component 114). Further, there may be an anticipated sequence of output signals including output signals conveying contact with first base following the output signals conveying swinging of a bat. The output signals conveying contact with first base may be associated with control signals for controlling locomotion of a virtual opponent to throw the virtual baseball to the second base. This sequence is output signals (e.g., bat swing followed by first base being contacted) is just one example of an anticipated sequence of output signals given the particular game of baseball.

In some implementations, action sequence information may further include alternate control signals. The alternate control signals may include control signals to be implemented in response to output signals of the real-world items of playing equipment not matching the anticipated output signals. The alternate control signals may control the locomotion of individual virtual objects. The alternate control signals may control the locomotion of the individual virtual objects differently form the anticipated control signals. The alternate control signals may be associated with the negative progress of gameplay, as described herein. For example, alternate control signals may control virtual content such that the gameplay may be replayed, reset, ended, and/or other types of control. By way of non-limiting illustration, for baseball, in response to a strike, alternate control signals may control virtual content to reflect one or more of another pitch being thrown, an inning being ended, a game being ended, and/or other controls.

The user information may include user profiles of users of the system 100. An individual user profile may define attribute values of user attributes. The attribute values impacting the anticipated control signals. The impact on the anticipated control signals by the attribute values may comprise an impact on magnitude of the locomotion of the virtual content caused by implementation of the anticipated control signals. In some implementations, the impact on magnitude of the locomotion may include impact on one or more of a speed, spin, trajectory, drag, and/or other control. In some implementations, an "impact" may include one or more of an increase, a decrease, and/or other impact. In some implementations, an impact may be specified as one or more of a linear increase and/or decrease, a multiplier, an exponential increase and/or decrease, and/or other considerations.

In some implementations, user attributes may include one or more of a speed attribute, an accuracy attribute, and/or other attributes. A value of a given attribute may be used to define the given attribute.

A value of a speed attribute may specify an impact on control signals affecting a speed of locomotion of virtual content. In some implementations, a value of a speed attribute may be qualitative and/or quantitative.

A qualitative value may include a description of speed and/or other information. By way of non-limiting illustration, a qualitative value may include one or more of "slow," "neutral," "fast," and/or other information. In some implementations, "neutral" may correspond to no impact on the speed of locomotion, e.g., the locomotion may be calculated based on conventional considerations of the laws of physics without increase and/or decrease from that calculation. In some implementations, "slow" may correspond to a negative impact on the speed of locomotion, e.g., the locomotion may be calculated based on conventional considerations of the laws of physics and decreased some amount from that calculation. In some implementations, "fast" may correspond to a positive impact on the speed of locomotion, e.g., the locomotion may be calculated based on conventional considerations of the laws of physics and increased some amount from that calculation (e.g., a "2× multiplier").

A quantitative value may include a numerical value and/or other numerical representation of speed and/or other information. By way of non-limiting illustration, a quantitative value may include one or more of "0.5," "1," "2," and/or other values. In some implementations, a "1" value may correspond to no impact on the speed of locomotion, e.g., the locomotion may be calculated based on conventional considerations of the laws of physics without increase and/or decrease from that calculation. In some implementations, a "0.5" value may correspond to a negative impact on the speed of locomotion, e.g., the locomotion may be calculated based on conventional considerations of the laws of physics and decreased from that calculation. In some implementations, "2" may correspond to a positive impact on the speed of locomotion, e.g., the locomotion may be calculated based on conventional considerations of the laws of physics and increased from that calculation (e.g., a "2× multiplier").

A value of an accuracy attribute may specify an impact on control signals affecting an accuracy of locomotion of virtual content. In some implementations, a value of an accuracy attribute may be qualitative and/or quantitative.

A qualitative value may include a description of an accuracy and/or other information. By way of non-limiting illustration, a qualitative value may include one or more of "less accurate," "neutral," "more accurate," and/or other information. In some implementations, "neutral" may correspond to no impact on the accuracy of locomotion, e.g., the locomotion may be calculated based on conventional considerations of the laws of physics without increase and/or decrease from that calculation. In some implementations, "less accurate" may correspond to a negative impact on the accuracy of locomotion, e.g., the locomotion may be calculated based on conventional considerations of the laws of physics and decreased some amount from that calculation. In some implementations, "more accurate" may correspond to a positive impact on the accuracy of locomotion, e.g., the locomotion may be calculated based on conventional considerations of the laws of physics and increased some amount from that calculation.

A quantitative value may include a numerical value and/or other numerical representation of accuracy and/or other information. By way of non-limiting illustration, a quantitative value may include one or more of "0.5," "1," "2," and/or other values. In some implementations, a "1" value may correspond to no impact on the accuracy of locomotion, e.g., the locomotion may be calculated based on conventional considerations of the laws of physics without improvement and/or worsening from that calculation. In some implementations, a "0.5" value may correspond to a negative impact on the accuracy of locomotion, e.g., the locomotion may be calculated based on conventional considerations of the laws of physics and worsened from that calculation. In some implementations, "2" may correspond to a positive impact on the speed of locomotion, e.g., the locomotion may be calculated based on conventional considerations of the laws of physics and improved from that calculation.

The above descriptions of user attributes and/or impact on locomotion of virtual content are provided for illustrative purposes only and are not to be considered limiting. Instead, it is understood within the scope of this disclosure that other attributes may be considered which may impact locomotion in other ways.

In some implementations, sets of value of user attributes may correspond to one or more of historical, current, fantastical, and/or other types of players and/or teams. For example, a set of values of user attributes for one or more users may be determined which may cause an impact on locomotion of virtual content in a predetermined manner. By way of non-limiting illustration, the set of values may be determined such that impact on locomotion of virtual content matches the abilities of a historical team of players (and/or current team of players, fantastical team of players, and/or other considerations). For illustrative purposes and without limitation, the set of values may be determined for individual users of system 100 such that impact on locomotion of virtual content matches the abilities of the 1927 Yankees team. As such the real-world users of system 100 may play augmented reality baseball as if having the abilities of the players on that team. Further, virtual opponents may be configured based on predetermined sets of values such that the virtual opponents play a game in a predetermined manner. By way of non-limiting illustration, virtual opponents may be configured to exhibit an impact on locomotion of virtual content which matches the abilities of the 1927 Yankees team. Virtual opponents may be controlled by artificial intelligence.

The presentation device 132 may include one or more of one or more physical processors 134, non-transitory electronic storage 138, a display 140, one or more sensors 142, one or more network interfaces 143, and/or other components.

The one or more network interfaces 143 may include one or more devices and/or software components configured to enable the exchange of information with one or more networks 130. By way of non-limiting illustration, the one or more network interfaces 143 may include a software and/or hardware interface. The one or more network interfaces 143 may include communication lines and/or ports configured to enable the exchange of information with one or more networks 130. The one or more network interfaces 143 may include transceivers and/or other components configured to facilitate communication with one or more of wireless Bluetooth Low Energy (BLE), wired Universal Serial Bus (USB) connection, Wi-Fi, 5G network, and/or other connections.

One or more physical processors 134 may be configured to provide information-processing capabilities in presentation device 132. The one or more physical processors 134 may be the same as or similar to one or more physical processors 104 of server(s) 102, described herein. That is, one or more physical processor 134 of presentation device 132 may provide the same or similar functionality to presentation device 132 as one or more physical processors 104 provides presentation device 132 via server(s) 102.

The display 140 may be configured to present virtual content, views of the real world, and/or other content. Virtual content may be in the form of images, video, text, and/or other content. Views of the real-world may be in the form of images and/or video. Presentation of content via display 140 may be facilitated by control signals communicated to display 140 (see, e.g., control component 114). The display 140 may include one or more of a screen, a set of screens, a touchscreen, a monitor, and/or other displays.

In some implementations, display 140 may be configured to present virtual content individually to each eye of a user as stereoscopic pairs. In some implementations, presentation device 132 may comprise, for example, a headset (not shown in FIG. 1). When presentation device 132 is installed on a user's head, the user's gaze may be directed towards presentation device 132 (or at least display 140) to view content presented by and/or on display 140.

In some implementations, display 140 may include one or more of a transparent, semi-transparent, reflective, and/or semi-reflective display component. Images of virtual content may be presented on display 140 such that the user may view the images presented on display 140 as well as the real-world through display 140. The virtual content may be perceived as being present in the real world. Such a configuration may provide an interactive space comprising an augmented reality environment with an active view of the real world.

In some implementations, display 140 may comprise a display screen configured to present virtual content. The user may view the display screen such that the display screen may encompass, substantially or entirely, the users vision without providing views of the real-world through the display screen. Such a configuration may provide an interactive space comprising a virtual reality environment.

Individual sensors of one or more sensors 142 may be configured to generate output signals. In some implementations, an individual sensor may include one or more of an orientation sensor, a depth sensor, an image sensor, a location, and/or other sensors.

An orientation sensor may be configured to generate output signals conveying orientation information and/or other information. Orientation information derived from output signals of an orientation sensor may define an orientation of presentation device 132. In some implementations, orientation of presentation device 132 may refer to one or more of a pitch angle, a roll angle, a yaw angle, a heading, a pointing direction, a bearing, and/or other measurements. An orientation sensor may include an inertial measurement unit (IMU) such as one or more of an accelerometer, a gyroscope, a magnetometer, Inclinometers, and/or other devices.

In some implementations, an image sensor may be configured to generate output signals conveying image information. Image information may define images of the real world. Image information may specify visual content within a field of view of the image sensor. The visual content may include real-world objects and/or surfaces present in the real world. The image information may specify visual content in the form of pixels in an image. Pixels may be defined by one or more of location (e.g., two-dimensional coordinates), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

The images of the real world may be used to detect presence and/or determine location of real-world items of playing equipment and/or augmented reality markers disposed on the real-world items of playing equipment. Detection of presence of augmented reality markers may be performed using one or more image-processing techniques. One or more image processing techniques may include one or more of bundle adjustment, speeded up robust features (SURF), scale-invariant feature transform (SIFT), computer vision, and/or other techniques. In some implementations, an augmented reality marker may include one or more of a picture, a glyph, a shape, and/or other marker.

In some implementations, a depth sensor may be configured to generate output signals conveying depth information and/or other information. Depth information may include distance and/or range of real-world surfaces and/or objects from the depth sensor, and/or other information. In some implementations, depth information may be provided in the form of a point cloud. A point cloud may include a set of points. Individual points may represent individual surfaces within the real world. The depth information may specify, for individual points, one or more of an individual distance of the point from the depth sensor, an individual orientation of the point with respect to the depth sensor, and/or other information. In some implementations, a depth sensor may comprise one or more of a time-of-flight sensor, a structured light sensor, an unstructured light sensor, an active stereo pair, a passive stereo pair, and/or other depth sensing devices.

In some implementations, a location sensor may be configured to generate output signals conveying location information and/or other information. Location information may include location of the location sensor within the real-world environment. The location may be specified with respect to a composition included in an environment record. In some implementations, a location sensor may comprise a global position system (GPS), and/or other location sensing devices.

The one or more physical processors 134 may be configured by machine-readable instructions 136. Executing machine-readable instructions 136 may cause one or more physical processors 134 to facilitate providing a sport-based interactive experience. The machine-readable instructions 136 may include one or more computer program components. The one or more computer program components may include the same or similar components as described with respect to machine-readable instructions 106 of server(s) 102.

In FIG. 1, the one or more physical processors 104 of server(s) 102 may be configured by machine-readable instructions 106. Executing machine-readable instructions 106 may cause one or more physical processors 104 to facilitate providing a sport-based interactive experience. The machine-readable instructions 106 may include one or more computer program components. The one or more computer program components may include one or more of a content component 108, a detection component 110, a record component 112, a control component 114, an input component 116, and/or other components.

The content component 108 may be configured to obtain information stored by storage 120 and/or other storage location for implementation by one or more other components of machine-readable instructions 106.

The detection component 110 may detect the presence of one or more of individual reference points, individual users, individual real-world items of playing equipment, and/or other entities. Detection component 110 may obtain output signals generated by one or more image sensors (not shown) present within a real-world environment. Detection component 110 may detect the presence based on image information conveyed by the output signals, and/or other information. The image information may define visual content depicting a real-world environment. In some implementations, detection component 110 may utilize one or more image processing techniques to detect presence of individual entities, determine locations of the individual entities, and/or perform other operations. One or more image processing techniques may include one or more of bundle adjustment, speeded up robust features (SURF), scale-invariant feature transform (SIFT), computer vision, and/or other techniques.

The record component 112 may be configured to determine environment record information and/or other information. Techniques to determine environment record information may include one or more of simultaneous localization and mapping (SLAM), parallel tracking and mapping (PTAM), particle filter localization, image registration, stereophotogrammetry, Speeded Up Robust Features (SURF), Scale-Invariant Feature Transform (SIFT), Oriented FAST (Features from Accelerated Segment Test) and rotated BRIEF (Binary Robust Independent Elementary Features) (ORB), Binary Robust Invariant Scalable Keypoints (BRISK), and/or other techniques. These techniques may utilize, as input, output signals from sensors disposed an arranged the sports playing area (not shown in FIG. 1) including one or more of an image sensor, a depth sensor, and/or other sensors.

In some implementations, record component 112 may be configured to specify, within the environment record information, individual locations of individual reference points in the sports playing area. By doing so, a virtual environment may be specified with respect to the individual locations and/or other information. This may result in the multiple presentation devices having synced environment records. By way of non-limiting illustration, multiple presentation devices may utilize the same origin within a coordinate system for specifying virtual content.

The control component 114 may be configured effectuate presentation of images depicting one or more instances of virtual content on presentation device 132. The control component 114 may be configured effectuate presentation of images on presentation device 132 by controlling presentation device 132 (e.g., via display 140) to generate and present images of virtual content. By way of non-limiting illustration, control component 114 may communicate control signals to presentation device 132 which cause the presentation device 132 to generate and/or present images. The control component 114 may be configured to control presentation device 132 to present a first image depicting a first instance of the first virtual object.

The input component 116 may be configured to obtain current output signals generated by the sensors coupled to the real-world items of playing equipment. By way of non-limiting illustration, input component 116 may be configured to obtain a first current output signal generated by a first sensor of one or more sensors 146.

The input component 116 may be configured to determine whether the current output signals match output signals included in the anticipated sequences of output signals. By way of non-limiting illustration, input component 116 may be configured to determine whether the first current output signal matches the first output signal included in the first anticipated sequence of output signals.

The control component 114 may be configured to control the presentation of the images on presentation devices based on the outcome of the determination of whether the current output signals match output signals included in the anticipated sequences of output signals (e.g., by input component 116).

For example, in some implementations, in response to determining the current output signals match output signals included in the anticipated sequences of output signals, control component 114 may be configured to control the presentation of the images in accordance with the anticipated control signals. This may mean that gameplay is progressing as expected within the context of the game. By way of non-limiting illustration, in response to obtaining a first current output signal generated by the first sensor and determining the first current output signal matches the first output signal, control component 114 may be configured to control the presentation of the first image of the first instance of the first virtual object based on the first control signal.

In some implementations, in response to determining the current output signals do not match the output signals included in the anticipated sequences of output signals, control component 114 may be configured to control the presentation of the images in accordance with alternate control signals. By way of non-limiting illustration, in response to obtaining the first current output signal and determining the first current output signal does not match the first output signal, control component 114 may be configured to control the presentation of the first image of the first instance of the first virtual object based on a first alternate control signal.

In some implementations, control component 114 may be configured to queue anticipated control signals in response to determining one or more current output signals match output signals included in an anticipated sequence of output signals. Queuing the anticipated control signals may facilitate real time and/or near real time implementation of the control signals to provide a life-like immersive experience for the users. By way of non-limiting illustration, in response to determining (e.g., by the input component 116) the first current output signal matches the first output signal, control component 114 may be configured to queue a second control signal associated with a second output signal included in the first anticipated sequence of output signals and/or other control signals. The second output signal may correspond to output signals of a second sensor coupled to a second real-world item of playing equipment.

In some implementations, control component 114 may be configured to determine the control signal based on one or more of current output signals, user profiles, and/or other information. In some implementations, determining control signals may include configuring the control signals to cause virtual content to experience a locomotion which may be responsive to movement of the real-world items of play equipment conveyed by the current output signals. In some implementations, locomotion which may be responsive to movement of the real-world items of play equipment may be based on simulated contact of individual virtual objects and the real-world items of play equipment. In some implementations, locomotion which may be responsive to movement of the real-world items of play equipment may be determined by calculations using the conventional equations in physics and/or geometry. In some implementations, determining the control signal based on user profiles may include modifying the control signals determined based on conventional equations in physics and/or geometry by the impact associated with user profiles. By way of non-limiting illustration, the impact may be specified as one or more of a linear increase and/or decrease, a multiplier, an exponential increase and/or decrease, and/or other considerations.

In some implementations, control component 114 may be configured to determine control signals for controlling virtual opponents based on detections made by detection component 110, and/or other information. By way of non-limiting illustration, detection component 110 may be configured to detect presence of a first set of users playing a game against a first set of virtual opponents. The detection component 110 may be configured determine and track locations of the first set of users over the play of the game. The control component 114 may be configured to determined control signals for controlling a second set of virtual opponents that match and/or substantially match the tracked movement of the first set of users. The second set of virtual opponents may be presented to a second set of users playing the game. Similar functionality may be carried out such that the first set of virtual opponents matches and/or substantially matches tracked movement of the second set of user. Accordingly, it is envisioned that the first set of users may be physically present in a real-world environment including a playing area and the second set of users may be physically present in a separate distinct real-world environment including another instance (e.g., copy) of the playing area. The first set of users may be able to "virtually" play the second set of users. By way of non-limiting illustration, users on a baseball field in Japan may play against virtual opponents which mirror movement of other users on a baseball field in the USA, who are in turn playing against virtual opponents which mirror movement of the users in Japan.

FIGS. 3-6 illustrate various implementations of the system of FIG. 1 configured to provide a sport-based interactive experience.

Figure 3:
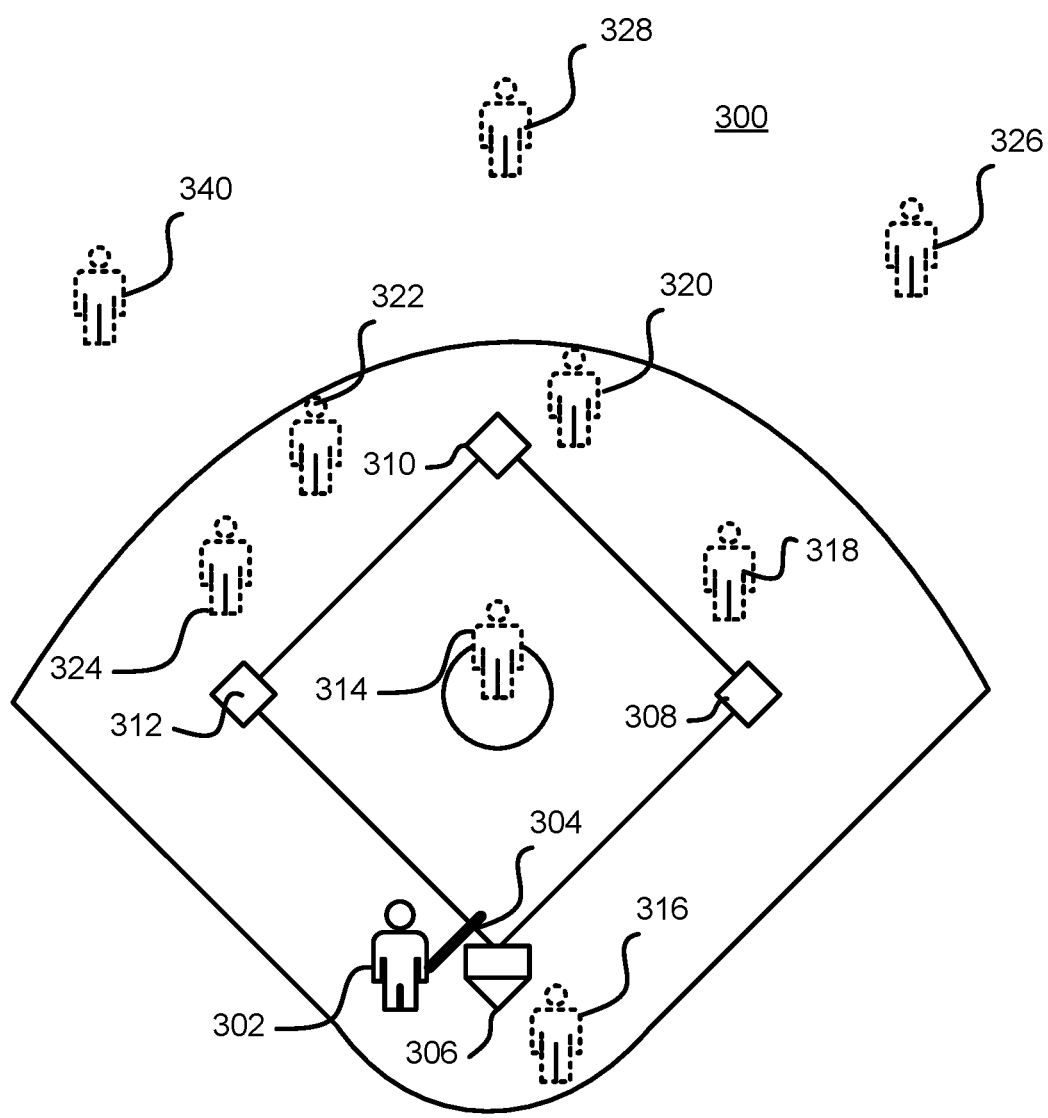
FIG. 3 shows a graphic illustration of an implementation of the system of FIG. 1.

FIG. 3 shows a graphic illustration of an implementation of the system of FIG. 1. FIG. 3 illustrates an interactive environment 300 including one or more of a real-world user 302 in a real-world environment comprising a sports playing area (e.g., a baseball field), an item of sports playing equipment 304 (e.g., a baseball bat), a virtual environment including virtual objects positioned in the real-world environment (e.g., virtual objects 314, 316, 318, 320, 322, 324, 326, 328, and 330), and/or other components. The sports playing area may include one or more reference points, including reference points 306, 308, 310, and/or 312. The reference points 306-312 in the current depiction may represent bases. The reference points 306-312 in this example may also comprise items of real-world playing equipment and may be individually outfitted with one or more sensors. One or more of the reference points 306-312 may be used to specify the virtual environment within the real-world environment. In the depiction, the user 302 may be a batter within the game, and the virtual objects 314-330 may be virtual opponents positioned at various locations in accordance with common play of the game of baseball.

Figure 4:
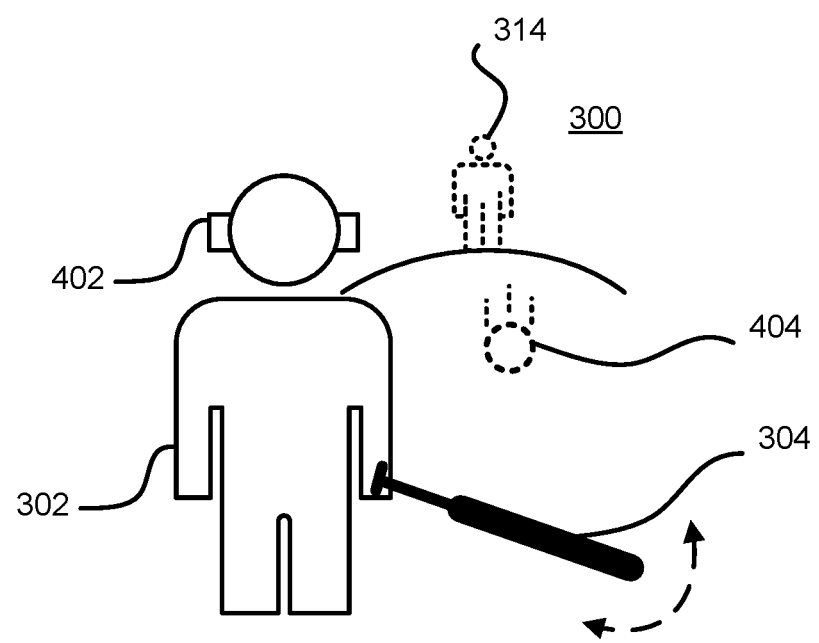
FIG. 4 shows a graphic illustration of an implementation of the system of FIG. 1.

FIG. 4 shows another graphic illustration of an implementation of the system of FIG. 1. In FIG. 4, a more detailed view of the user 302 is show. The user 302 may be wearing a presentation device 402 configured to generate images forming views of the virtual content, including a virtual opponent 314, a virtual item of playing equipment 404 (e.g., a baseball), and/or other content. The item of sports playing equipment 304 may include one or more sensors and/or other components. The item of sports playing equipment 304 may be configured to generate output signals conveying motion of the item of sports playing equipment 304, and/or other information. The system may access action sequence information specifying an anticipated sequence of output signals including one or more of an output signal generated by a sensor of the item of sports playing equipment 304, an output signal generated by a sensor of another item of sports playing equipment (e.g., such as a first base represented by a reference point 308 shown in FIG. 5), and/or other output signals from individual items of sports playing equipment. By way of non-limiting illustration, the anticipated sequence of output signals may include a sequence related to one or more of a swinging movement of the bat conveyed by output signals generated by a sensor of the item of sports playing equipment 304, followed by a touch of the first base (e.g., reference point 308 in FIG. 5) conveyed by the output signal generated by a sensor on the first base, and/or followed by other output signals from other items of sports playing equipment. The output signal generated by the sensor of the item of sports playing equipment 304 may be associated with a first control signal for controlling the virtual item of playing equipment 404 and/or other control signals for controlling virtual content.

In response to determining current output signals from the item of playing equipment 304 match output signals included in the anticipated sequence of output signals, the first control signal for controlling the virtual item of playing equipment 404 and/or other control signals for controlling other virtual content may be obtained and/or implemented.

Figure 5:
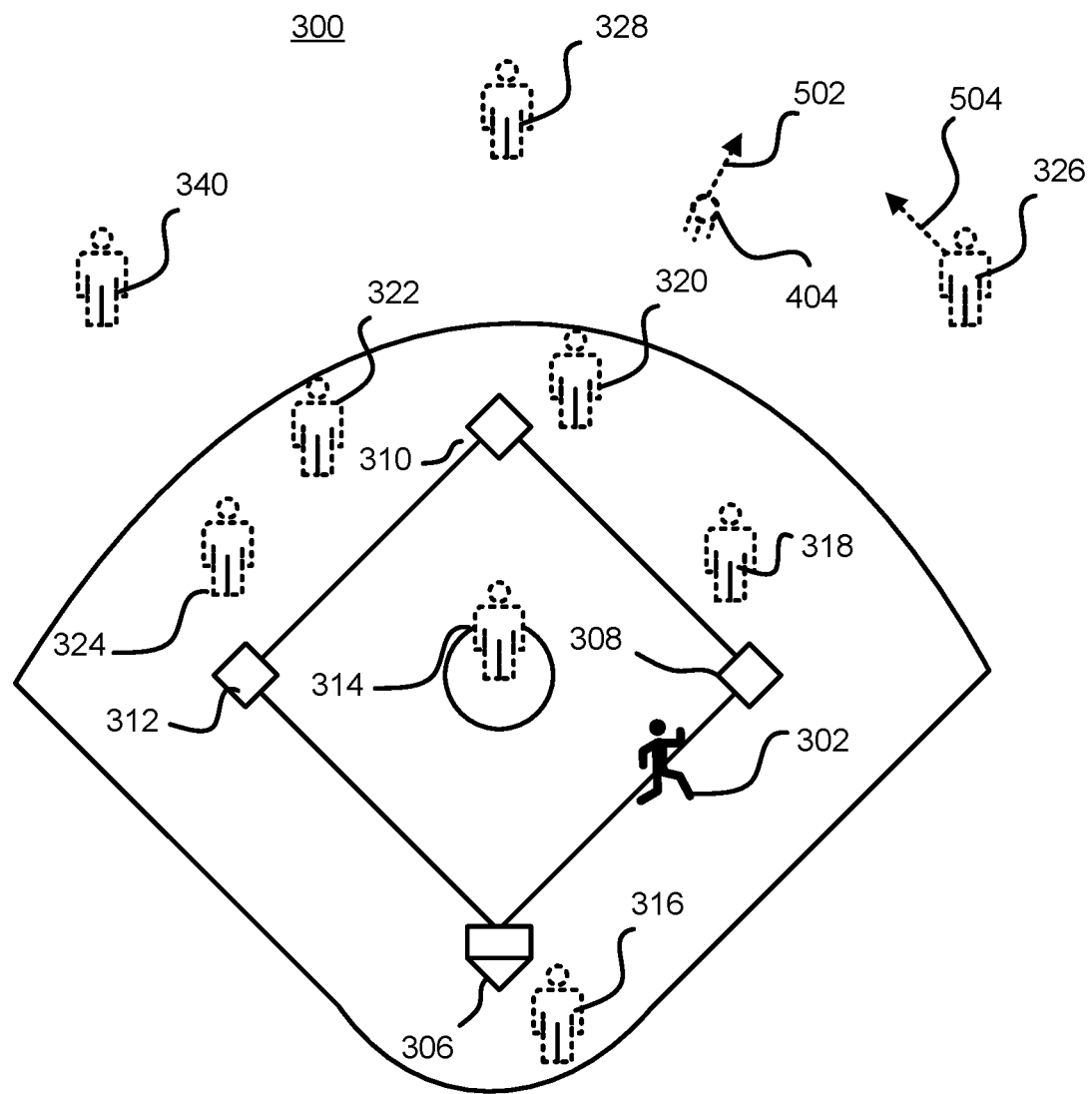
FIG. 5 shows a graphic illustration of an implementation of the system of FIG. 1.

FIG. 5 shows the implementation of the first control for controlling the virtual item of playing equipment 404 and/or other control signals for controlling other virtual content. By way of non-limiting illustration, in response to a swing of the bat, the first control signal may be implemented to control the virtual item of playing equipment 404 to cause the virtual item of playing equipment 404 to travel along a trajectory 502 calculated based on current output signals (e.g., speed of swing, direction of swing, etc.). Other control signals may include control signals for controlling a virtual opponent 326 to traverse the playing area to intercept the trajectory 502 in an attempt to catch the virtual item of playing equipment 404.

In some implementations, although not shown, if the current output signals of the item of playing equipment 304 do not match signals in the anticipated sequence of output signals (e.g., the swing did not generate output signals in a manner that would convey a simulated contact of the bat with the virtual ball), then an alternate control signal may have been implemented. By way of non-limiting illustration, alternate control signals may include one or more of controlling the virtual opponent 316 (e.g., catcher) to throw the virtual item of playing equipment 404 back to the virtual opponent 314 (e.g., the pitcher), controlling the virtual opponent 314 to throw another pitch, ending the game, and/or other considerations of alternate controls.

Figure 6:
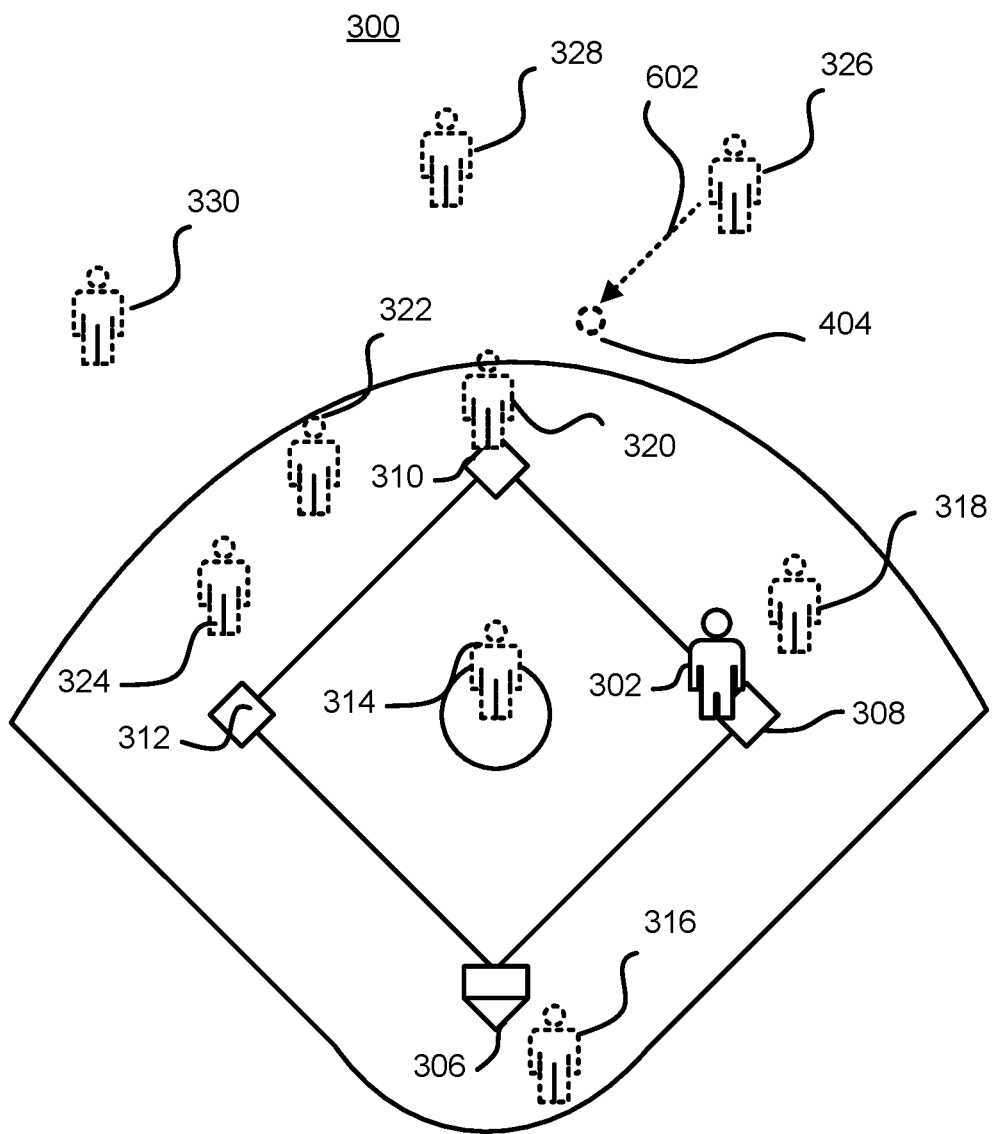
FIG. 6 shows a graphic illustration of an implementation of the system of FIG. 1.

FIG. 6 shows further the implementation of control signals in accordance with an anticipated sequence of output signals. For example, an output signal in the anticipated sequence may include output signals from sensors(s) on the first base (represented by reference point 308) conveying a touch of the first base by the user 302. In response to the contact, control signals may be implementation to perform one or more of control a virtual opponent 320 to traverse the playing area to reach second base (represented by reference point 310), control the virtual item of playing equipment 404 to travel along a trajectory 602 from virtual opponent 326 to virtual opponent 320 (e.g., simulated a throw of the baseball from virtual opponent 326 to virtual opponent 320), and/or other control.

It is noted that although one or more descriptions of the systems and methods presented herein may be directed to gameplay on a sports playing area specifically designated for the play of a game (e.g., a baseball field, a basketball court, etc.), this is for illustrative purposes only and not to be considered limiting. Instead, those skilled in the art may readily recognize that the various features and/or functions presented herein may be implemented in areas that may not be specifically constructed and designated for the play of a game. For example, it is to be understood that a temporary sports playing area may be made by users of system 100 by, for example, arranging real-world items of playing equipment and/or otherwise configuring reference points within a generally open area in a manner to resemble an area specifically designated for the play of a game. In some implementations, in the context of baseball, users may create reference points in a real-world environment by drawing lines in the ground, drawing bases, drawing a pitcher's mound, drawing a fence, etc. within an open area to create a temporary sports playing area for the game of baseball. In some implementations, in the context of baseball, users may create one or more reference points based on their physical location. For example, a user may stand in a given location and use that location to specify a reference point in the real-world (e.g., which may be utilized as a coordinate system origin for a virtual environment). As an example, in the context of baseball, a user may stand in a location to be designated as a reference point for home base and a virtual environment may be specified based on that location. The remaining items of playing equipment needed to complete the playing area may then be provided by virtual objects (e.g., the other bases, the pitcher's mound, and/or other items may be provided by the presentation of virtual objects). In some implementations, in the context of baseball, users may position physical bases comprising real-world items of playing equipment within an open area to resemble a baseball diamond. The real-world item(s) of playing equipment and/or the user-created reference point(s) may be detected (e.g., via detection component 110 and/or other components in FIG. 1) and/or a determination may be made that the arrangement resembles a particular sports playing area so that gameplay may commence.

Returning to FIG. 1, external resource(s) 131 may include sources of information, hosts, and/or providers of information outside of system 100, external entities participating with system 100, and/or other resources. In some implementations, some or all of the functionality attributed herein to external resource(s) 131 may be provided by resources included in system 100. By way of non-limiting illustration, an external entity may include a server configured to provide virtual content information and/or other information.

Individual presentation devices may include one or more network interfaces, communication lines, and/or ports to enable the exchange of information with one or more networks 130. The one or more networks 130 may include wired and/or wireless connections. By way of non-limiting illustration, one or more networks 130 may include one or more of the Internet, wireless Bluetooth Low Energy (BLE), wired Universal Serial Bus (USB) connection, Wi-Fi, 5G network, and/or other connections. It will be appreciated that this is not intended to be limiting and that the scope of this disclosure includes implementations in which components of system 100 may be operatively linked via some other communication media.

Illustration of the server(s) 102 in FIG. 1 is not intended to be limiting. The server(s) 102 may include a plurality of hardware, software, and/or firmware components operating together to provide the functionality attributed herein to the presentation devices. For example, server(s) 102 may be implemented by a cloud of computing platforms operating together.

Illustration of the presentation device 132 in FIG. 1 is not intended to be limiting. The presentation device 132 may include a plurality of hardware, software, and/or firmware components operating together to provide the functionality attributed herein to the presentation devices. For example, presentation device 132 may be implemented by a cloud of computing platforms operating together.

Electronic storage 120 of server(s) 102 may include electronic storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 104, information received from external resource(s) 131, and/or other information that enables system 100 to function as described herein. Electronic storage 138 of presentation device 132 may have similarly features and/or may provide similarly functionality to presentation device 132 as electronic storage 120 provides to server(s) 102.

Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-116. Processor(s) 104 may be configured to execute components 108-114 by software; hardware; firmware; some combination of software, hardware, and/or firmware; and/or other mechanisms for configuring processing capabilities on processor(s) 104.

It should be appreciated that although components 108-116 are illustrated in FIG. 1 as being co-located within a single processing unit, in implementations in which processor(s) 104 includes multiple processing units, one or more of components 108-116 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-116 described above is for illustrative purposes and is not intended to be limiting, as any of components 108-116 may provide more or less functionality than is described. For example, one or more of components 108-116 may be eliminated, and some or all of its functionality may be provided by other ones of components 108-116 and/or other components. As another example, processor(s) 104 may be configured to execute one or more additional components that may perform some or all of the functionality attributed to one of components 108-116.

Although processor(s) 134 is shown in FIG. 1 as a single entity, this is for illustrative purposes only. In some implementations, processor(s) 134 may include one or more processing units. These processing units may be physically located within the same device, or processor(s) 134 may represent processing functionality of a plurality of devices operating in coordination. The processor(s) 134 may be configured to execute computer program components. Processor(s) 134 may be configured to execute computer program components by software; hardware; firmware; some combination of software, hardware, and/or firmware; and/or other mechanisms for configuring processing capabilities on processor(s) 134.

Figure 2:
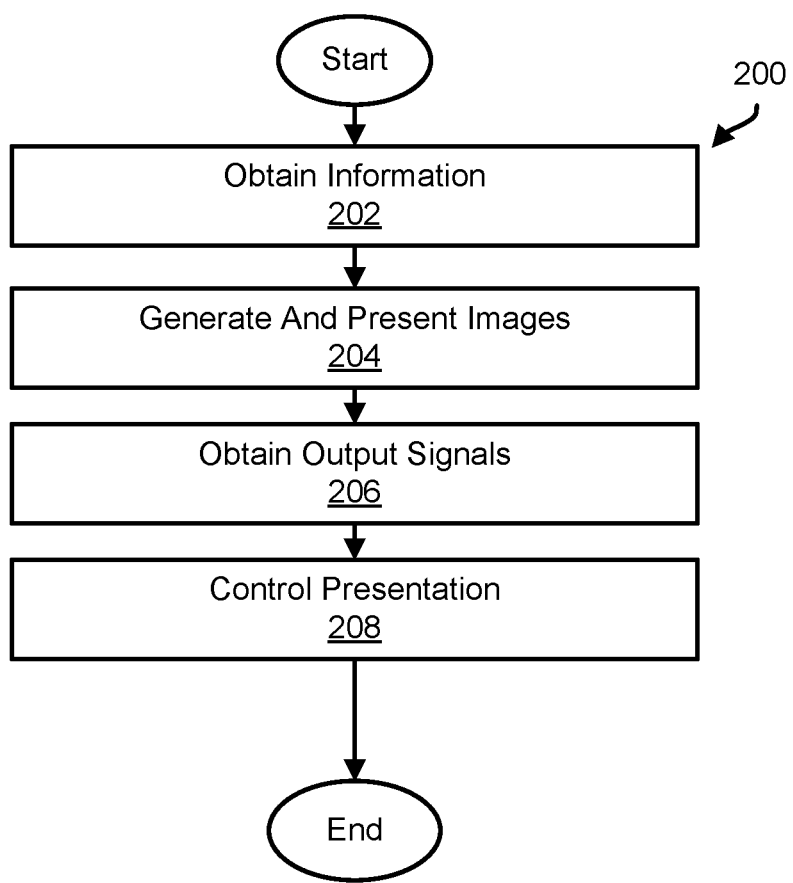
FIG. 2 illustrates a method to provide a sport-based interactive experience, in accordance with one or more implementations.

FIG. 2 illustrates a method 200 to provide a sport-based interactive experience, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a system comprising one or more processing devices (e.g., a digital processor, an analog processor, a digital circuit designed to process information, an analog circuit designed to process information, a state machine, and/or other mechanisms for electronically processing information), non-transitory electronic storage medium, one or more real-world items of playing equipment, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200. By way of non-limiting illustration, method 200 may be implemented in a presentation device the same as or similar to server(s) 102 (shown in FIG. 1 and described herein).

At an operation 202, information may be obtained. The information may include one or more of environment record information, virtual content information, action sequence information, and/or other information. The environment record information may define a composition of a real-world environment comprising a sports playing area. The composition of the real-world environment may include one or more reference points in the sports playing area. The virtual content information may define a virtual environment including virtual content. The virtual environment may be specified with respect to the one or more reference points within the real-world environment. The virtual content may include one or more virtual objects. Individual virtual objects may be configured to experience locomotion within the virtual environment. The one or more virtual objects may include a first virtual object depicting an item of playing equipment specific to the sports playing area. The action sequence information may specify anticipated sequences of output signals generated by sensors coupled to real-world items of playing equipment. The output signals in the anticipated sequences of output signals may be associated with anticipated control signals for controlling the virtual content. By way of non-limiting illustration, the action sequence information may specify a first anticipated sequence of output signals including a first output signal generated by a first sensor coupled to a first real-world item of playing equipment, and/or other output signals. The first output signal may be associated with a first control signal for controlling the first virtual object and/or other virtual objects. In some implementations, operation 202 may be performed by one or more physical processors executing a content component the same as or similar to content component 108 (shown in FIG. 1 and described herein).

At an operation 204, presentation may be effectuated of images depicting one or more instances of the virtual content on presentation devices associated with users. The images may be presented such that the one or more instances of the virtual content may be perceived as being physically present in the real-world environment. By way of non-limiting illustration, presentation may be effectuated on a first presentation device of a first image depicting a first instance of the first virtual object. In some implementations, operation 204 may be performed by one or more physical processors executing a control component the same as or similar to control component 114 (shown in FIG. 1 and described herein).

At an operation 206, current output signals generated by the sensors coupled to the real-world items of playing equipment may be obtained. At the operation 206, it may be determined whether the current output signals match output signals included in the anticipated sequences of output signals. In some implementations, operation 206 may be performed by one or more physical processors executing an input component the same as or similar to input component 116 (shown in FIG. 1 and described herein).

At an operation 208, the presentation of the images may be controlled in accordance with the anticipated control signals. The presentation may be controlled in response to determining whether the current output signals match output signals included in the anticipated sequences of output signals. In some implementations, operation 208 may be performed by one or more physical processors executing a control component the same as or similar to control component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a sport-based augmented reality experience, the system comprising:
   non-transitory electronic storage medium storing:
      environment record information, the environment record information defining a composition of a real-world environment comprising a sports playing area, the composition of the real-world environment including one or more reference points in the sports playing area;
      virtual content information, the virtual content information defining a virtual environment including virtual content, the virtual environment being specified with respect to the one or more reference points within the real-world environment, the virtual content including one or more virtual objects, individual virtual objects being configured to experience locomotion within the virtual environment, the one or more virtual objects including a first virtual object depicting an item of playing equipment specific to the sports playing area; and
      action sequence information, the action sequence information specifying anticipated sequences of output signals generated by sensors coupled to real-world items of playing equipment, output signals in the anticipated sequences of output signals being associated with anticipated control signals for controlling the virtual content, such that the action sequence information specifies a first anticipated sequence of output signals including a first output signal generated by a first sensor coupled to a first real-world item of playing equipment, the first output signal being associated with a first control signal for controlling the first virtual object; and
   one or more physical processors configured by machine-readable instructions to:
      effectuate presentation of images depicting one or more instances of the virtual content on presentation devices associated with users, the images being presented such that the one or more instances of the virtual content are perceived as being physically present in the real-world environment, such that presentation is effectuated of a first image depicting a first instance of the first virtual object on a first presentation device;
      obtain current output signals generated by the sensors coupled to the real-world items of playing equipment and determine whether the current output signals match the output signals included in the anticipated sequences of output signals; and
      in response to determining the current output signals match the output signals included in the anticipated sequences of output signals, control the presentation of the images in accordance with the anticipated control signals, such that in response to obtaining a first current output signal generated by the first sensor and determining the first current output signal matches the first output signal, control the presentation of the first image of the first instance of the first virtual object based on the first control signal.

2. The system of claim 1, wherein the one or more physical processors are further configured by the machine-readable instructions to:
in response to determining the current output signals do not match the output signals included in the anticipated sequences of output signals, control the presentation of the images in accordance with alternate control signals, such that in response to obtaining the first current output signal and determining the first current output signal does not match the first output signal, control the presentation of the first image of the first instance of the first virtual object based on a first alternate control signal.

3. The system of claim 1, wherein the one or more physical processors are further configured by the machine-readable instructions to:
queue the anticipated control signals in response to determining the current output signals match output signals included in the anticipated sequences of output signals, such that in response to determining the first current output signal matches the first output signal, queue a second control signal associated with a second output signal included in the first anticipated sequence of output signals, the second output signal corresponding to the output signals of a second sensor coupled to a second real-world item of playing equipment.

4. The system of claim 1, wherein the non-transitory electronic storage medium further stores user profiles associated with the users, an individual user profile defining attribute values of user attributes, the attribute values impacting the anticipated control signals.

5. The system of claim 4, wherein the anticipated control signals control the locomotion of the individual virtual objects, and wherein the impact on the anticipated control signals by the attribute values comprises an impact on magnitude of the locomotion of the virtual content.

6. The system of claim 4, wherein the individual user profile is associated with a historical real-world player.

7. The system of claim 1, wherein the current output signals are generated by the sensors coupled to the real-world items of playing equipment in response to motion of the real-world items of playing equipment.

8. The system of claim 1, wherein the one or more physical processors are further configured by the machine-readable instructions to:
determine the anticipated control signals for controlling the locomotion of the virtual content based on the current output signals to cause the virtual content to experience the locomotion responsive to movement of the real-world items of play equipment, such that the first control signal is determined based on the first current output signal.

9. The system of claim 1, wherein the locomotion includes one or more of spin, movement along a trajectory, or vibration.

10. The system of claim 1, wherein the action sequence information includes multiple sets of anticipated sequences of output signals, wherein an individual set of anticipated sequences of output signals is specific to a particular game.

11. A method to provide a sport-based augmented reality experience, the method comprising:
obtaining:
environment record information, the environment record information defining a composition of a real-world environment comprising a sports playing area, the composition of the real-world environment including one or more reference points in the sports playing area;
virtual content information, the virtual content information defining a virtual environment including virtual content, the virtual environment being specified with respect to the one or more reference points within the real-world environment, the virtual content including one or more virtual objects, individual virtual objects being configured to experience locomotion within the virtual environment, the one or more virtual objects including a first virtual object depicting an item of playing equipment specific to the sports playing area; and
action sequence information, the action sequence information specifying anticipated sequences of output signals generated by sensors coupled to real-world items of playing equipment, output signals in the anticipated sequences of output signals being associated with anticipated control signals for controlling the virtual content, such that the action sequence information specifies a first anticipated sequence of output signals including a first output signal generated by a first sensor coupled to a first real-world item of playing equipment, the first output signal being associated with a first control signal for controlling the first virtual object;
effectuating presentation of images depicting one or more instances of the virtual content on presentation devices associated with users, the images being presented such that the one or more instances of the virtual content are perceived as being physically present in the real-world environment, including effectuating presentation of a first image depicting a first instance of the first virtual object on a first presentation device;
obtaining current output signals generated by the sensors coupled to the real-world items of playing equipment and determining whether the current output signals match the output signals included in the anticipated sequences of output signals; and
in response to determining the current output signals match the output signals included in the anticipated sequences of output signals, controlling the presentation of the images in accordance with the anticipated control signals, including in response to obtaining a first current output signal generated by the first sensor and determining the first current output signal matches the first output signal, controlling the presentation of the first image of the first instance of the first virtual object based on the first control signal.

12. The method of claim 11, further comprising:
in response to determining the current output signals do not match the output signals included in the anticipated sequences of output signals, controlling the presentation of the images in accordance with alternate control signals, including in response to obtaining the first current output signal and determining the first current output signal does not match the first output signal, controlling the presentation of the first image of the first instance of the first virtual object based on a first alternate control signal.

13. The method of claim 11, further comprising:
queuing the anticipated control signals in response to determining the current output signals match output signals included in the anticipated sequences of output signals, including in response to determining the first current output signal matches the first output signal, queuing a second control signal associated with a second output signal included in the first anticipated sequence of output signals, the second output signal corresponding to the output signals of a second sensor coupled to a second real-world item of playing equipment.

14. The method of claim 11, further including obtaining user profiles associated with the users, an individual user profile defining attribute values of user attributes, the attribute values impacting the anticipated control signals.

15. The method of claim 14, wherein the anticipated control signals control the locomotion of the individual virtual objects, and wherein the impact on the anticipated control signals by the attribute values comprises an impact on magnitude of the locomotion of the virtual content.

16. The method of claim 14, wherein the individual user profile is associated with a historical real-world player.

17. The method of claim 11, wherein the current output signals are generated by the sensors coupled to the real-world items of playing equipment in response to motion of the real-world items of playing equipment.

18. The method of claim 11, further comprising:
determining the anticipated control signals for controlling the locomotion of the virtual content based on the current output signals to cause the virtual content to experience the locomotion responsive to movement of the real-world items of play equipment, including determining the first control signal based on the first current output signal.

19. The method of claim 11, wherein the action sequence information includes multiple sets of anticipated sequences of output signals, wherein an individual set of anticipated sequences of output signals is specific to a particular game.

20. A system configured to provide a sport-based augmented reality experience, the system comprising:
one or more real-world items of playing equipment, a first real-world item of playing equipment including one or more of one or more sensors, one or more feedback devices, or one or more network interfaces;
one or more presentation devices, a presentation device including a display configured to present images forming virtual content, such that when the presentation device is worn on a user's head, a gaze of the user is directed towards the display and the virtual content is perceived as being present in a real-world environment;
non-transitory electronic storage medium storing:
environment record information defining a composition of the real-world environment comprising a sports playing area;
virtual content information defining a virtual environment including the virtual content specified with respect to the composition, the virtual content including a first virtual object depicting a second real-world item of playing equipment; and
action sequence information, the action sequence information specifying a first anticipated sequence of output signals including a first output signal generated by a first sensor coupled to the first real-world item of playing equipment, the first output signal being associated with a first control signal for controlling the first virtual object; and
a set of one or more physical processors configured by machine-readable instructions to:
obtain current output signals generated by the first sensor of the first real-world item of playing equipment and determine whether the current output signals match output signals included in the first anticipated sequence of output signals; and
in response to obtaining a first current output signal generated by the first sensor and determining the first current output signal matches the first output signal, control the presentation device to present a first image of the first virtual object based on the first control signal.

* * * * *